United States Patent
Kong et al.

(10) Patent No.: US 9,009,755 B2
(45) Date of Patent: Apr. 14, 2015

(54) MATCH-RULE BASED SERVICE MESSAGE TRANSFER METHOD AND SYSTEM

(75) Inventors: Jianhua Kong, Shenzhen (CN); Bin Yang, Shenzhen (CN); Liming Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/581,628

(22) PCT Filed: Jun. 24, 2011

(86) PCT No.: PCT/CN2011/076257
§ 371 (c)(1),
(2), (4) Date: Aug. 29, 2012

(87) PCT Pub. No.: WO2012/031497
PCT Pub. Date: Mar. 15, 2012

(65) Prior Publication Data
US 2013/0007824 A1    Jan. 3, 2013

(30) Foreign Application Priority Data
Sep. 6, 2010 (CN) .......................... 2010 1 0276283

(51) Int. Cl.
H04N 7/10      (2006.01)
H04N 7/025     (2006.01)
H04N 21/258    (2011.01)

(52) U.S. Cl.
CPC ............................. H04N 21/25891 (2013.01)

(58) Field of Classification Search
CPC ..................... H04N 21/25; H04N 65/4076
USPC ........... 725/9–21, 25–31, 35, 37, 46, 48, 105, 725/135, 34
See application file for complete search history.

(56) References Cited

U.S. PATENT DOCUMENTS

| 6,108,706 A | 8/2000 | Birdwell |
|---|---|---|
| 6,628,625 B1 | 9/2003 | Birdwell |

(Continued)

FOREIGN PATENT DOCUMENTS

| CN | 1379946 A | 11/2002 |
|---|---|---|
| WO | 0130043 A2 | 4/2001 |
| WO | WO 01/63837 A2 * | 8/2001 |

OTHER PUBLICATIONS

International Search Report in international application No. PCT/CN2011/076257, mailed on Oct. 13, 2011.

(Continued)

*Primary Examiner* — Pankaj Kumar
*Assistant Examiner* — Alazar Tilahun
(74) *Attorney, Agent, or Firm* — Oppedahl Patent Law Firm LLC (57) ABSTRACT

The disclosure provides a match-rule based service message transfer method and system in the IPTV, to address the problems in the IPTV message system of message storing and backlog, low push efficiency and poor usability. In the disclosure, match fields are arranged in a set-top box and a service message to be sent, the service message is sent by means of broadcast or multicast, the set-top box performs matching for the match fields based on the match rule, and filters the message. The disclosure avoids sending a service message by means of unicast, increases the push efficiency and can greatly reduce the storage load of offline messages in a message system. The formed message may be sent according to a single or combined policy which depends on a specific service attribute, thereby greatly facilitating the service operation.

11 Claims, 4 Drawing Sheets

(56) References Cited

U.S. PATENT DOCUMENTS

| 7,072,955 | B1 | 7/2006 | Huckins | |
|---|---|---|---|---|
| 2004/0027996 | A1 | 2/2004 | Birdwell | |
| 2005/0028195 | A1 | 2/2005 | Feinleib | |
| 2005/0166257 | A1 | 7/2005 | Feinleib | |
| 2007/0211720 | A1 | 9/2007 | Fuchs | |
| 2009/0049390 | A1* | 2/2009 | Nason et al. | 715/747 |

OTHER PUBLICATIONS

English Translation of the Written Opinion of the International Search Authority in international application No. PCT/CN2011/076257, mailed on Oct. 13, 2011.

Supplementary European Search Report in European application No. 11823020.0, mailed on Oct. 6, 2014.

* cited by examiner

MATCH-RULE BASED SERVICE MESSAGE TRANSFER METHOD AND SYSTEM

TECHNICAL FIELD

The disclosure relates to the technical field of Internet Protocol Television (IPTV), and in particular to a match-rule based service message transfer method and system in the IPTV.

BACKGROUND

At present, in an IPTV system, an application side device generally sends a message to a terminal side device in the traditional way of short message center. However, as the user model of the IPTV system is an offline model, that is, users are not online at most of the time, the message storage load in the message center is greatly increased. The load is increased exponentially with the amount of users, which puts the system operation at risk, and the risk becomes more significant as service of the message type get expanded. Furthermore, issuing messages one by one by using a user list is of low efficiency, and push time becomes longer as the amount of users increases. At the same time, if a message is to be sent to a plurality of users with a specified service attribute, these users have to be imported to a group before the message is sent, which is relatively troublesome to operate.

Therefore, in the message system, message storing and backlog, low push efficiency, poor usability and the like have been greatly concerned.

SUMMARY

The disclosure provides a match-rule based service message transfer method and system in the IPTV, to mitigate message storing and backlog, low push efficiency and poor usability in the IPTV message system.

In view of the above, the following technical solutions are provided.

A match-rule based service message transfer method is provided, which includes the following steps:

obtaining, by a set-top box, a user-related match field from a match rule server;

obtaining, by a message management system, a message-related match field from a match rule server, and forming a message according to a sending strategy and the message-related match field;

distributing, by a message center, the message to the set-top box by means of broadcast or multicast, wherein the message carries the message-related match field;

receiving, by the set-top box, the message, and determining whether the message-related match field carried in the message matches the locally stored user-related match field; if so, storing and presenting the message; otherwise, discarding the message.

Preferably, obtaining the user-related match field includes the following steps:

sending, by the set-top box after being started, a match field request message carrying a user account to the match rule server;

generating, by the match rule server, the user-related match field according to a service subscribed by the user and corresponding service entity objects, after receiving the match field request message;

returning, by the match rule server, the user-related match field to the set-top box.

Preferably, after the set-top box obtains the user-related match field, the method further includes the following steps:

sending, by the set-top box, an offline message request carrying the user account and a local time stamp to the message center;

generating, by the message center, an offline message not yet received by the user according to the user account and the local time stamp carried in the offline message request, and returning the offline message to the set-top box, wherein the offline message carries the message-related match field.

Preferably, the message management system obtaining the message-related match field and forming the message includes the following steps:

after information on a message body is input, determining a single or a combined sending strategy according to the specific service attribute;

requesting from the match rule server, by the message management system, the message-related match field corresponding to the sending strategy;

writing, by the message management system, the message body, the sending strategy and the message-related match field into a database.

Preferably, the message center distributing the message to the set-top box includes the following steps:

sending, by the message management system, a message sending request to the message center, wherein the request carries the message body of message to be sent, the message sending strategy and the message-related match field;

the message center sends the message to the set-top box by means of broadcast or multicast according to the sending strategy, wherein the message carries the message-related match field.

Preferably, the set-top box receiving the message includes the following steps:

receiving and parsing, by the set-top box, the message, and obtaining the message-related match field and the message body carried in the message; then matching the message-related match field carried in the message with the locally stored user-related match field; if the message-related match field carried in the message matches the locally stored user-related match field, storing and presenting the message and updating the local time stamp in the set-top box to the current time; otherwise, discarding the message.

Preferably, both the user-related match field and the message-related match field are of a string type, include one or more pieces of service attribute information in a fixed and consistent sequence, and include one or more service entity object identities at a position corresponding to the service attribute;

the message-related match field is matched with the user-related match field by using the following match rule: performing a match for each of the service attributes; if any service entity object identity included in the service attribute in the message-related match field exists in service entity object identities included in the corresponding service attribute in the user-related match field, determining the current service attribute as matching; otherwise, determining the current service attribute as not matching; only if all the service attributes are determined as matching, determining the message-related match field and the user-related match field as matching; otherwise, determining the message-related match field and the user-related match field as not matching.

Based on the above-mentioned method, the disclosure further provides a match-rule based service message transfer system, which includes:

a match rule server, configured to store and manage a match-rule based match field, wherein the match field include a user-related match field and a message-related match field, and the match fields include a service attribute and a service entity object identity.

a message management system, configured to obtain the message-related match field from the match rule server, and to form a message according to a message sending strategy;

a message center, configured to send the message to the set-top box by means of broadcast or multicast, wherein the message contains the message-related match field.

a set-top box, configured to obtain the user-related match field from the match rule server, to match the message-related match field which are carried in the received message with the obtained user-related match field, if the message-related match field carried in the received message matches the obtained user-related match field, to receive the message; otherwise, to discard the message.

Preferably, the set-top box includes:

a rule obtaining module, configured to, when the set-top box is started, obtain a user-related match rule from the match rule server;

a message reception control module, configured to receive the message from the message center, to obtain the message-related match field from the message, and to request an offline message from the message center when the set-top box is started;

a message matching module, configured to obtain the message-related match field from the message reception control module, to obtain the user-related match field from the rule obtaining module, and to match the message-related match field with the user-related match field;

a message storage module, configured to store a matching message;

a message presenting module, configured to present the matching message.

Preferably, both the user-related match field and the message-related match field are of a string type, include one or more pieces of service attribute information in a fixed and consistent sequence, and include one or more service entity object identities at a position corresponding to the service attribute;

the message matching module matches the message-related match field with the user-related match field by using the following match rule: performing a match for each of the service attributes; if any service entity object identity included in the service attribute in the message-related match field exists in service entity object identities included in the corresponding service attribute in the user-related match field, determining the current service attribute as matching; otherwise, determining the current service attribute as not matching; only if all the service attributes are determined as matching, determining the message-related match field and the user-related match field as matching; otherwise, determining the message-related match field and the user-related match field as not matching.

In the disclosure, match fields are arranged in a set-top box and a service message to be sent, the service message is sent by means of broadcast or multicast, the set-top box performs matching for the match fields based on the match rule, and filters the message. The disclosure avoids sending a service message by means of unicast, increases the push efficiency and can greatly reduce the storage load of offline messages in a message system. The formed message may be sent according to a single or combined policy which depends on a specific service attribute, thereby greatly facilitating the service operation.

DETAILED DESCRIPTION

The basic concept of the disclosure lies in that, a match rule may be introduced into the IPTV message system, a user-related match field may be arranged in the set-top box, and a message-related match field may be carried in a message being sent. The user-related match field contains an attribute of the service subscribed by the user and a service entity object identity, and the message-related match field contains an attribute of the target service pushed by the message and a service entity object identity. After receiving a message sent from the message center, the set-top box matches the locally stored user-related match field and the message-related match field which is carried in the message; when the two match fields match exactly, the set-top box stores and presents the message; otherwise, the set-top box discards the message.

For clarifying the effect, the technical solutions and the advantages of the disclosure, the disclosure is described below by illustrating embodiments in detail with reference to the accompanying drawings.

Figure 1A:
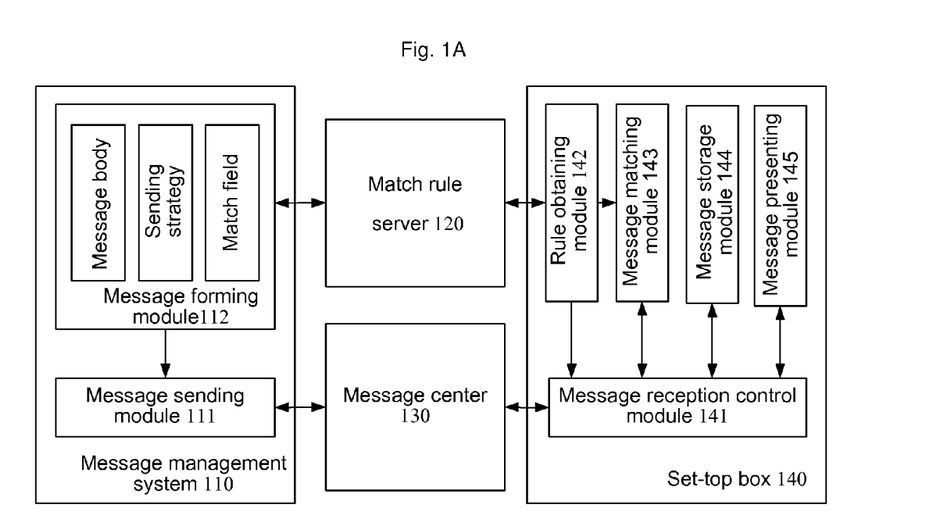
FIG. 1A shows a block diagram of a match-rule based message transfer system according to the disclosure.

FIG. 1A shows a block diagram of a match-rule based message transfer system according to the disclosure. The system includes a message management system 110, a match rule server 120, a message center 130 and a set-top box 140.

The match rule server 120 is configured to store and manage a match-rule based match field, wherein the match field includes a user-related match field and a message-related match field, and the match fields include a service attribute and a service entity object identity.

The message management system 110 is configured to form a message according to a message sending strategy and the message-related match field, and to send the message body, the sending strategy and the message-related match field to the message center in a message sending request, wherein the message carry the message-related match field.

The message management system 110 further includes a message forming module 112 and a message sending module 111.

the message center 130 is configured to receive the message sending request, and to send the message to the set-top box by means of broadcast or multicast, wherein the message contains the message-related match field.

The set-top box 140 is configured to obtain the user-related match field from the match rule server 120, to match the message-related match field which is carried in the received message with the obtained user-related match field, to receive the service message if the message-related match field matches user-related match field exactly and to discard the service message if otherwise.

The set-top box 140 further includes a message reception control module 141, a rule obtaining module 142, a message matching module 143, a message storage module 144 and the message presenting module 145.

Figure 1B:
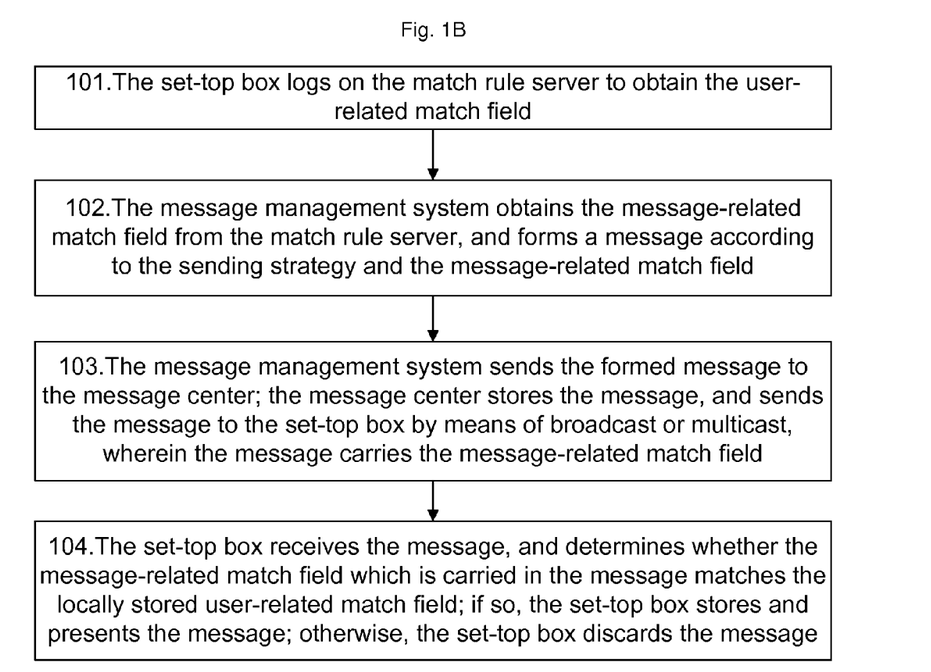
FIG. 1B shows a flowchart of a match-rule based message transfer method according to the disclosure.

FIG. 1B shows a flowchart of a match-rule based service message transfer method in the IPTV according to the disclosure. The method according to the disclosure will be described below in connection with the system structure as shown in FIG. 1A.

Step 101: the set-top box 140 logs on the match rule server 120 to obtain the user-related match field;

Step 102: the message management system 110 obtains the message-related match field from the match rule server 120, and forms a message according to the sending strategy and the message-related match field;

Step 103: the message management system sends the formed message to the message center; the message center stores the message, and sends the message to the set-top box 140 by means of broadcast or multicast, wherein the message carries the message-related match field.

Step 104: the set-top box 140 receives the message, and determines whether the locally stored user-related match field matches the message-related match field which is carried in the message; if so, the set-top box stores and presents the message; otherwise, the set-top box discards the message.

Figure 2:
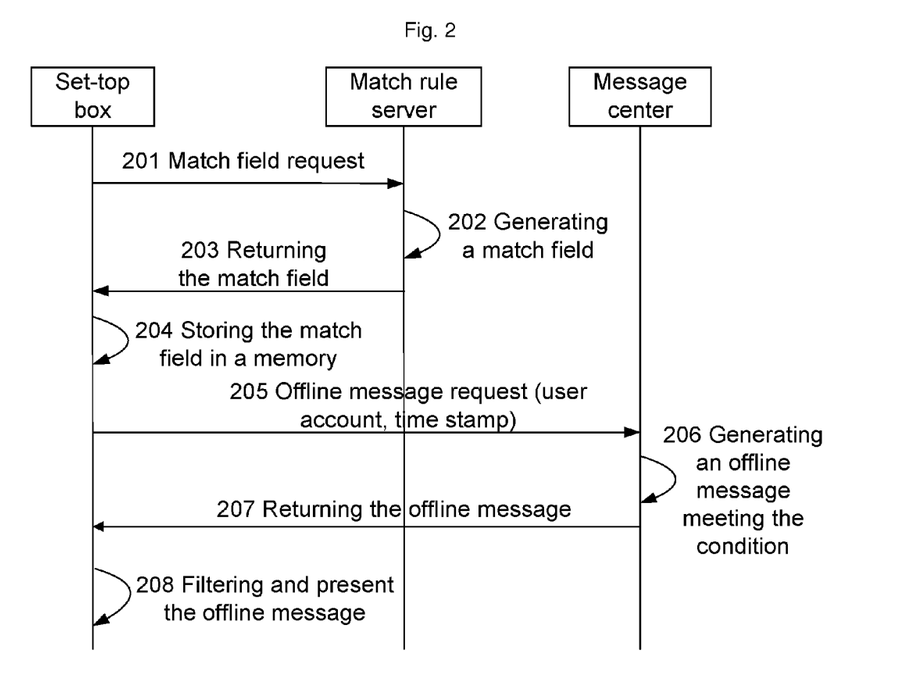
FIG. 2 shows a process of obtaining the user-related match field by the set-top box according to the disclosure.

FIG. 2 shows a process of obtaining the user-related match field by the set-top box according to the disclosure. The above step 101 comprises the following steps:

Step 201: after the set-top box is started, the rule obtaining module 142 sends a match field request message to the match rule server, wherein the message carries a user account;

Step 202: after receiving the match field request message, the match rule server extracts and checks the user account; if the user is illegal, the match rule server directly refuses; if the user is legal, the match rule server searches a service subscribed by the user and a corresponding service entity object according to the user account, and generates a match field of the user;

Step 203: the match rule server returns the match field of the user to the rule obtaining module 142 of the set-top box;

Step 204: after receiving the match field, parsing the match fields, and the rule obtaining module 142 parses the match field, divides the match field according to service attributes and service objects, and stores the divided match field in the rule obtaining module 142;

the above steps are preparations for the subsequent message reception. Meanwhile, the set-top box also obtains and presents the offline message in the logging on process, which includes the following steps:

Step 205: the message reception control module 141 of the set-top box obtains its own user account and local time stamp, and then sends an offline message request to the message center. The local time stamp is the time instant of the last time when the set-top box receives the message from the message center;

Step 206: after receiving the offline message request, the message center generates the offline message not received by the user according to the user account and the local time stamp at the user side, wherein the offline message carries the message-related match field;

the message center compares the current time instant with the local times tamp at user side, which is carried in the offline message request, to obtain the offline message which are not received by the user during a time period from the local timestamp at user side to the current time instant;

Step 207: the message center returns the offline message to the message reception control module 141 of the set-top box by means of unicast;

Step 208: after receiving the offline message, the set-top box filters the message in a same way as described in Step 104.

Figure 3:
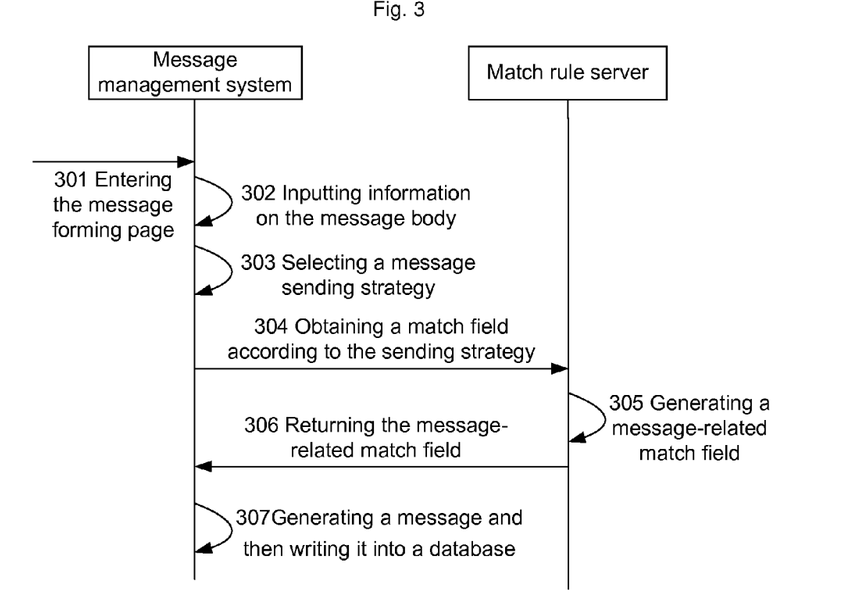
FIG. 3 shows a process of forming a message by the message management system according to the disclosure.

FIG. 3 shows a process of forming a message by the message management system according to the disclosure, corresponding to Step 102. The process includes the following steps:

Step 301: an operator logs on the message management system and enters the message making module 112;

Step 302: message body information is inputted through the message making module 112, wherein message body information includes message type, message content, message link and so on;

Step 303: a sending strategy for the message is selected through the message forming module 112. The sending strategy may include, for example, sending the message to users in a certain region, and sending the message to users in a certain strategy group; the sending strategy can be a single or a combined sending strategy, depending on the specific service attribute;

the single sending strategy refers to sending the message to users in a certain group or a certain region; the combined sending strategy refers to a sending strategy combining the group strategy with the region strategy, for example, a strategy of sending the message to users in a designated region in a certain group;

Step 304: the message forming module 112 sends a match field request to the match rule server according to the selected sending strategy, wherein the request carries sending strategy parameters;

Step 305: after receiving the request, the match rule server generates the corresponding message-related match field according to the sending strategy parameters in the request;

In a preferred embodiment of the disclosure, the generating of the corresponding message-related match field according to the sending strategy may include: sorting the sending strategy parameters, wherein each sending strategy parameter corresponds to a service attribute, is composed of multiple service entity objects; assembling service entities in the sending strategy parameters into service attribute fields by using a specified separator, and then assembling these service attribute fields into the message-related match field in a specified order and by using a specified separator;

Step 306: the match rule server returns the generated match fields to the message forming module 112 of the message management system;

Step 307: the message management system writes the message body, the sending strategy and the match field into a database.

Figure 4:
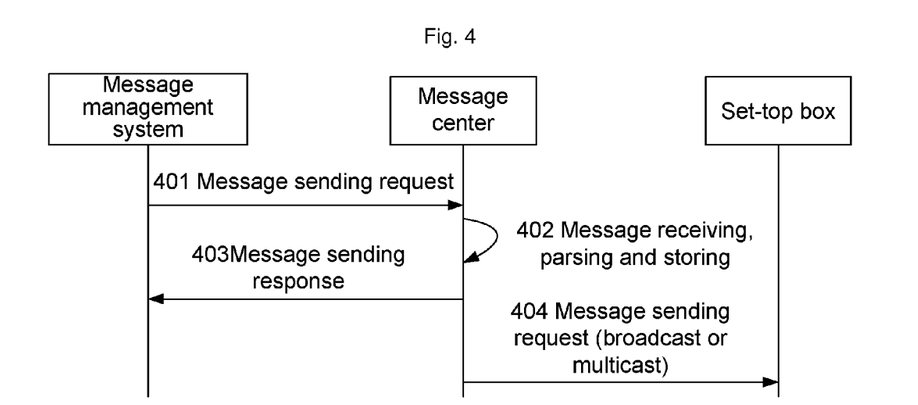
FIG. 4 shows a process of sending a message by the message center according to the disclosure.

FIG. 4 shows a process of sending a message according to the disclosure, corresponding to Step 103. The process includes the following steps:

Step 401: the message management system sends a message sending request to the message center through the message sending module 111, wherein the request carries the message body of message to be sent, the message sending strategy and the message-related match field;

Step 402: the message center parses and stores the message sending request after receiving it;

Step 403: the message center sends response to the message management system;

Step 404: the message center sends the message to the set-top box in a broadcast mode or a multicast mode according to the message sending strategy, wherein the message carries the message-related match field.

Figure 5:
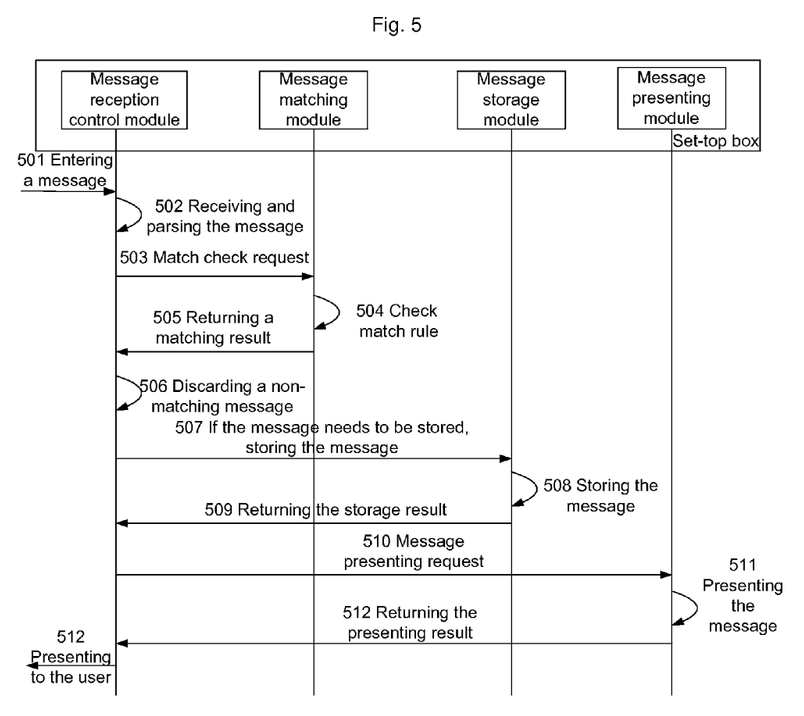
FIG. 5 shows a process of receiving and matching the message by the set-top box according to the disclosure.

FIG. 5 shows a process of receiving a message by the set-top box according to the disclosure, corresponding to Step 104. The process includes the following steps:

Step 501: the message is pushed to the set-top box by the message center;

Step 502: the set-top box receives and parses the message through the message reception control module 141, and obtains the message-related match field and the message body which are carried in the message;

Step 503: the message reception control module 141 of the set-top box initiates a matching request to the message matching module 143 by using the obtained match field; the message matching module 143 obtains the user-related match field from the rule obtaining module 142;

Step 504: the message matching module 143 of the set-top box matches the user-related match field with the message-related match field according to the match rule;

Step 505: the message matching module 143 of the set-top box returns a matching result to the message reception control module 141;

Step 506: the message reception control module 141 of the set-top box processes the message according to the matching result; if the matching result indicates "not matching", directly discards the message; if the matching result indicates "matching", the process turns to the next step;

Step 507: the message reception control module 141 of the set-top box determines whether the message needs to be stored; if so, the message reception control module 141 initiates a storing request to the message storage module 144; if not, the process turns to Step 510, and the message is discarded after being presented;

Step 508: the message storage module 144 of the set-top box stores the message, and updates the local times tamp of the set-top box to the current time;

Step 509: the message storage module 144 of the set-top box returns the storage result to the message reception control module 141;

Step 510: the message reception control module 141 of the set-top box initiates a presenting request to the message presenting module 145;

Step 511: the message presenting module 145 of the set-top box parses the message, and presents the message;

Step 512: the message presenting module 145 of the set-top box returns a presenting result, and finally presents it to the user.

Preferably, both the user-related match field and the message-related match field are of a string type, include one or more pieces of service attribute information in a fixed and consistent sequence, and include one or more service entity object identities at positions corresponding to the service attributes; the string is internally divided by service separators (e.g., '|'); the service separators are used for distinguishing different service attributes; in a same service attribute, different service entity object identities are distinguished through object separators (e.g., ','). For example, a string can take the specific form of 'A1, A2, A3|B1, B2|C1, C2, C3, C4||E1, E2'. The service attribute may be null, which indicates that there is not any service entity object.

the message matching module 143 matches the user-related match field with the message-related match field by using the following match rule: performing a match for each of the service attributes; if any service entity object identity included in the service attribute in the message-related match field exists in service entity object identities included in the corresponding service attribute in the user-related match field, determining the current service attribute as matching; otherwise, determining the current service attribute as not matching; only if all the service attributes are determined as matching, determining the user-related match field and the message-related match field match as matching; otherwise, determining the user-related match field and the message-related match field match as not matching.

For example, after obtaining the user-related match field from the match rule server, the set-top box divides the match field by using service separators and object separators, and stores the match field in its memory, wherein the sequence of the stored service attributes should be consistent with the sequence of the service attributes in the original match field, to avoid confusion. Similarly, in forming a message, the message management system obtains the message-related match field from the match rule server, and then places it at a certain field of the message to denote the range of objects to which the message is to be pushed. Sequences of the service attributes included in the user-related match field and the message-related match field must be consistent with each other, to avoid confusion in matching.

The set-top box obtains the match field in the message, and divides the match field by using service separators (e.g., '|'); then, the set-top box compares the first service attribute with the first service attribute in the user-related match field which is stored in the set-top box locally; if there is a service entity object in the first service attribute carried in the message matching any service entity object in the first service attribute in the user-related match field which is stored in the set-top box, it indicates that the first service attributes is matching; the set-top box continues the comparisons of the subsequent service attributes until all the service attributes are compared.

If there is only one service attribute carried in a message, then the set-top box receives the message as long as it is a matching service attribute; if there are more than two service attributes carried in a message, the set-top box performs matching for the service attributes one by one, and the set-top box receives the message only when all the service attributes are matching.

In view of the above, the disclosure has the following advantages: the match-rule based message system and method provided by the disclosure solve the problems of message storing and backlog, low push efficiency and poor usability, greatly facilitating the operation of the message service. Therefore, certain embodiments of the invention proposed have universal application significance in the field of IPTV message sending.

Of course, there may be many other embodiments; as those of ordinary skill in the art appreciate, various modifications and variations are possible without departing from the scope and spirit of the disclosure, and all of the modifications and variations shall fall within the scope of the disclosure as recited in the attached claims.

Industrial Applicability

In the disclosure, match fields are arranged in a set-top box and a service message to be sent, the service message is sent by means of broadcast or multicast, the set-top box performs matching for the match fields based on the match rule, and filters the message. The disclosure avoids sending a service message by means of unicast, increases the push efficiency and can greatly reduce the storage load of offline messages in a message system. The formed message may be sent according to a single or combined policy which depends on a specific service attribute, thereby facilitating the service operation.

The invention claimed is:

1. A match-rule based service message transfer method, comprising:

sending, by a set-top box after being started, a match field request message carrying a user account to a match rule server;

generating, by the match rule server after receiving the match field request message, a user-related match field according to a service subscribed by a user and corresponding service entity objects;

returning, by the match rule server, the user-related match field to the set-top box;

sending, by the set-top box after obtaining the user-related match field, an offline message request carrying the user account and a local time stamp, which is a time instant of last time when the set-box receives a message from the message center, to the message center;

generating, by the message center, an offline message not yet received by the user according to the user account and the local time stamp carried in the offline message request, and returning the offline message to the set-top box by means of unicast, wherein the offline message carries the message-related match field;

obtaining, by a message management system, a message-related match field from the match rule server, and forming a message according to a sending strategy and the message-related match field;

distributing, by a message center, the message to the set-top box by means of broadcast or multicast, wherein the message carries the message-related match field;

determining, by the set-top box after receiving the message, whether user-related match field obtained by the set-top box matches the message-related match field carried in the message; if so, storing and presenting the message; otherwise, discarding the message.

2. The method according to claim 1, wherein the obtaining, by the message management system, the message-related match field from the match rule server, and forming the message according to the sending strategy and the message-related match field comprises:

after information on a message body is input, determining a single or a combined sending strategy according to a specific service attribute;

requesting from the match rule server, by the message management system, the message-related match field corresponding to the sending strategy;

writing, by the message management system, the message body, the sending strategy and the message-related match field into a database.

3. The method according to claim 2, wherein the distributing, by the message center, the message to the set-top box by means of broadcast or multicast comprises:

sending, by the message management system, a message sending request to the message center, wherein the request carries the message body, the message sending strategy and the message-related match field of the message to be sent;

sending, by the message center, the message to be sent to the set-top box by means of broadcast mode or multicast according to the sending strategy, wherein the message to be sent carries the message-related match field.

4. The method according to claim 3, wherein the receiving of the message by the set-top box comprises:

parsing, by the set-top box after receiving the message from the message center, the message, and obtaining the message-related match field and the message body carried in the message; then, matching the message-related match field with the locally stored user-related match field; if the message-related match field matches the locally stored user-related match field, storing and presenting the message, and updating the local time stamp of the set-top box to a current time; otherwise, discarding the message.

5. The method according to claim 1, wherein both the user-related match field and the message-related match field are of a string type, include one or more pieces of service attribute information in a fixed and consistent sequence, and include one or more service entity object identities at a position corresponding to the service attribute;

the message-related match field is matched with the user-related match field by using the following match rule: performing a match for each of the service attributes; if any service entity object identity included in the service attribute in the message-related match field exists in service entity object identities included in the corresponding service attribute in the user-related match field, determining the current service attribute as matching; otherwise, determining the current service attribute as not matching; only if all the service attributes are determined as matching, determining the message-related match field and the user-related match field as matching; otherwise, determining the message-related match field and the user-related match field as not matching.

6. A match-rule based service message transfer system, comprising:

a match rule server, configured to generate, after receiving a match field request message from a set-top box, a user-related match field according to a service subscribed by a user and corresponding service entity objects, to return the user-related match field to the set-top box, and to store and manage a match-rule based match field, wherein the match field include the user-related match field and a message-related match field, and the match fields include a service attribute and a service entity object identity, a message management system, configured to obtain the message-related match field from the match rule server, and to form a message according to a message sending strategy;

a message center, configured to send the message containing the message-related match field to the set-top box by means of broadcast or multicast, to generate an offline message not yet received by the user according to a user account and a local time stamp, which is a time instant of last time when the set-top box receives a message from the message center, carried in an offline message request, and to return an offline message to the set-top box by means of unicast, wherein the offline message carries the message-related match field;

a set-top box, configured to send, after being started, the match field request message carrying the user account to a match rule server to obtain the user-related match field from the match rule server, to send, after obtaining the user-related match field, the offline message request carrying the user account and the local time stamp to the message center, to match the message-related match field carried in the received message with the obtained user-related match field, if the message-related match field carried in the received message matches the obtained user-related match field, to receive the message; otherwise, to discard the message.

7. The system according to claim 6, wherein the set-top box comprises:

a rule obtaining module, configured to, when the set-top box is started, obtain a user-related match rule from the match rule server;

a message reception control module, configured to receive the message from the message center, to obtain the message-related match field from the message, and to request an offline message from the message center when the set-top box is started;

a message matching module, configured to obtain the message-related match field from the message reception control module, to obtain the user-related match field from the rule obtaining module, and to match the message-related match field with the user-related match field;

a message storage module, configured to store a matching message;

a message presenting module, configured to present the matching message.

8. The system according to claim 7, wherein both the user-related match field and the message-related match field are of a string type, include one or more pieces of service attribute information in a fixed and consistent sequence, and include one or more service entity object identities at a position corresponding to the service attribute; the message matching module matches the message-related match field with the user-related match field by using the following match rule: performing a match for each of the service attributes; if any service entity object identity included in the service attribute in the message-related match field exists in service entity object identities included in the corresponding service attribute in the user-related match field, determining the current service attribute as matching; otherwise, determining the current service attribute as not matching; only if all the service attributes are determined as matching, determining the message-related match field and the user-related match field as matching; otherwise, determining the message-related match field and the user-related match field as not matching.

9. The method according to claim 2, wherein
both the user-related match field and the message-related match field are of a string type, include one or more pieces of service attribute information in a fixed and consistent sequence, and include one or more service entity object identities at a position corresponding to the service attribute;
the message-related match field is matched with the user-related match field by using the following match rule: performing a match for each of the service attributes; if any service entity object identity included in the service attribute in the message-related match field exists in service entity object identities included in the corresponding service attribute in the user-related match field, determining the current service attribute as matching; otherwise, determining the current service attribute as not matching; only if all the service attributes are determined as matching, determining the message-related match field and the user-related match field as matching; otherwise, determining the message-related match field and the user-related match field as not matching.

10. The method according to claim 3, wherein
both the user-related match field and the message-related match field are of a string type, include one or more pieces of service attribute information in a fixed and consistent sequence, and include one or more service entity object identities at a position corresponding to the service attribute;
the message-related match field is matched with the user-related match field by using the following match rule: performing a match for each of the service attributes; if any service entity object identity included in the service attribute in the message-related match field exists in service entity object identities included in the corresponding service attribute in the user-related match field, determining the current service attribute as matching; otherwise, determining the current service attribute as not matching; only if all the service attributes are determined as matching, determining the message-related match field and the user-related match field as matching; otherwise, determining the message-related match field and the user-related match field as not matching.

11. The method according to claim 4, wherein
both the user-related match field and the message-related match field are of a string type, include one or more pieces of service attribute information in a fixed and consistent sequence, and include one or more service entity object identities at a position corresponding to the service attribute;
the message-related match field is matched with the user-related match field by using the following match rule: performing a match for each of the service attributes; if any service entity object identity included in the service attribute in the message-related match field exists in service entity object identities included in the corresponding service attribute in the user-related match field, determining the current service attribute as matching; otherwise, determining the current service attribute as not matching; only if all the service attributes are determined as matching, determining the message-related match field and the user-related match field as matching; otherwise, determining the message-related match field and the user-related match field as not matching.

* * * * *